May 11, 1937. S. R. REIMEL 2,079,965
BELT
Original Filed Feb. 10, 1936
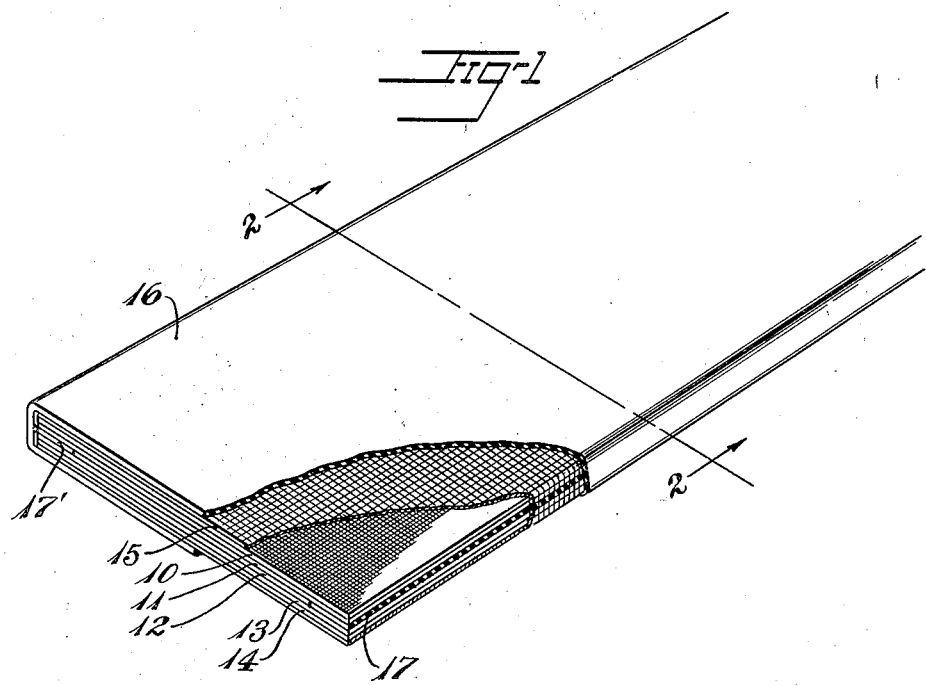
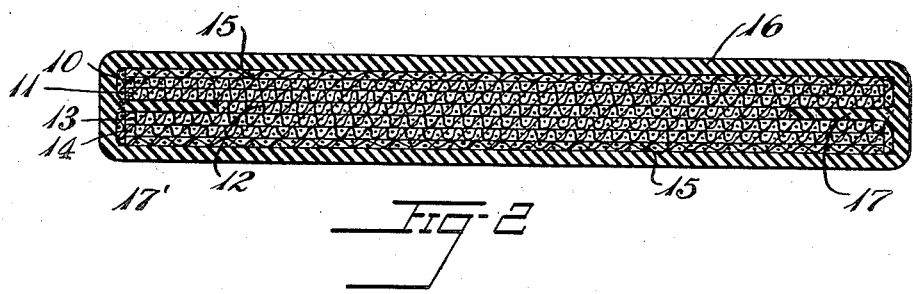
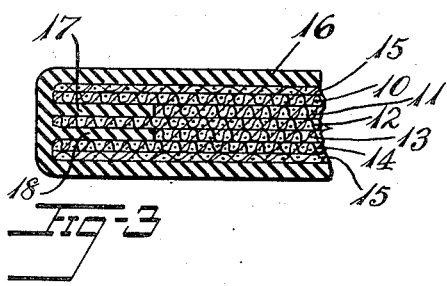
Inventor
Samuel R. Reimel
By Eakin + Avery
Attys Patented May 11, 1937

2,079,965

UNITED STATES PATENT OFFICE 2,079,965

BELT

Samuel R. Reimel, Akron, Ohio, assignor to The B. F. Goodrich Company, New York, N. Y., a corporation of New York Application February 10, 1936, Serial No. 63,096
Renewed March 11, 1937

7 Claims. (Cl. 74—232)

This invention relates to belts made of fabric and rubber and is especially useful in the manufacture of conveyor belts.

Belts used for conveying loose materials and articles are usually made of a plurality of layers of cotton belt duck surrounded by a cover of vulcanized rubber. A loosely woven layer of cotton material sometimes is placed between the plies of duck and the rubber cover. The plies of duck are frictioned and coated by calendering them with an unvulcanized rubber composition. This provides an adhesive coating to unite the plies face to face but where the plies are trimmed, either before or after being assembled face to face, their edges are not provided with a substantial amount of adhesive. As the belts are vulcanized under pressure applied to their faces the edges are not subjected to a pressure equivalent to that applied to their faces. The conveyor belts in use contact with guides along these edges and wear is most likely to occur at these edges, where separation of the elements of the belt is made possible by lack of proper vulcanizing pressure or adhesive.

The principal objects of the present invention are to provide security of construction and resistance to separation and abrasion along the edges of the belt.

Other objects will appear from the following description and the accompanying drawing.

Of the drawing:

Fig. 1 is a perspective view of the preferred form of the invention, a portion of the loosely woven tie fabric and the rubber cover being broken away to more clearly show the construction.

Fig. 2 is a cross-sectional view of the belt taken on line 2—2 of Fig. 1.

Fig. 3 is a similar fragmentary view showing a modified form of the invention.

Referring to the drawing, the strength giving element of the belt comprises superimposed plies 10, 11, 12, 13, and 14 of frictioned belt duck. The numeral 15 designates a layer of loosely woven cotton fabric or tie fabric, which encloses four sides of the slab comprising the tension element and helps to unite the fabric layers to the rubber cover 16.

In order to anchor the rubber cover 16 along the edges of the belt to the fabric plies, the ply 12 is cut substantially narrower than the other plies and the resulting space at each edge of the belt is filled by strips 17, 17', of unvulcanized rubber equal in thickness to the ply 12 and in width to the width of the resulting space. During the vulcanization of the belt the rubber strips 17, 17' become united to the cover 16 through the loosely woven tie fabric 15 and also to the fabric plies, providing a secure anchorage for the cover 16.

In the modified form shown in Fig. 3 a plurality of the plies, such as 11 and 13, are cut narrower than the remaining plies, and a plurality of rubber anchoring strips 17, 18, are provided in similar manner.

I claim:

1. A belt comprising a tension element of superimposed flat plies of duck, at least one of the intermediate plies being narrower than the others and providing a space at each edge of the belt between the juxtaposed plies, a vulcanized rubber cover surrounding the faces and edges of the belt, and anchoring strips of rubber filling the spaces adjacent the edges of the narrowed ply and united to the cover and the adjoining plies.

2. A belt comprising a tension element of superimposed flat plies of duck, at least one of the intermediate plies being narrower than the others and providing a space at each edge of the belt between the juxtaposed plies, a vulcanized rubber cover surrounding the faces and edges of the belt, a loosely woven fabric layer between the cover and the tension element, and anchoring strips of rubber filling the spaces adjacent the edges of the narrowed ply and united to the cover and the adjoining plies.

3. A belt comprising a tension element of superimposed flat plies of duck, at least one of the intermediate plies being narrower than the others and providing a space at each edge of the belt between the juxtaposed plies, a vulcanized rubber cover surrounding the faces and edges of the belt, a loosely woven fabric layer enclosing the tension element beneath said cover, and anchoring strips of rubber filling the spaces adjacent the edges of the narrowed ply and united to the cover and the adjoining plies.

4. A belt comprising a tension element of superimposed flat plies of duck, a plurality of the intermediate plies being narrower than the others and providing spaces at each edge of the belt between the juxtaposed plies, a vulcanized rubber cover surrounding the faces and edges of the belt, and anchoring strips of rubber filling the spaces adjacent the edges of the narrowed plies and united to the cover and the adjoining plies.

5. A belt comprising a tension element of superimposed flat plies of duck, a plurality of the intermediate plies being narrower than the others and providing spaces at each edge of the belt between the juxtaposed plies, a vulcanized rubber cover surrounding the faces and edges of the belt, a loosely woven fabric layer between the cover and the tension element, and anchoring strips of rubber filling the spaces adjacent the edges of the narrowed plies and united to the cover and the adjoining plies.

6. A belt comprising a tension element of superimposed plies of fabric, at least one of the intermediate plies having a lateral edge thereof terminating short of the edges of other of the plies providing a space therebetween, an anchoring body of rubber in said space and united to the plies, and a layer of covering rubber upon the faces and edges of the belt and united with the body of anchoring rubber.

7. A belt comprising a tension element of superimposed plies of fabric, intermediate ply margins terminating inwardly of adjacent ply margins providing spaces therebetween at the lateral edges of the belt, anchoring bodies of rubber in said spaces and united to the plies, and a layer of covering rubber upon the faces and edges of the belt and united with the bodies of anchoring rubber.

SAMUEL R. REIMEL.